(12) United States Patent
Fuwa et al.

(10) Patent No.: US 7,395,225 B2
(45) Date of Patent: Jul. 1, 2008

(54) CUSTOM-MADE PRODUCT SALES SYSTEM AND METHOD

(75) Inventors: Tetsuji Fuwa, Hashima (JP); Tsuyoshi Ogawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 594 days.

(21) Appl. No.: 10/204,665

(22) PCT Filed: Dec. 25, 2001

(86) PCT No.: PCT/JP01/11335

§ 371 (c)(1),
(2), (4) Date: Jun. 4, 2003

(87) PCT Pub. No.: WO02/054308

PCT Pub. Date: Jul. 11, 2002

(65) Prior Publication Data

US 2005/0102151 A1 May 12, 2005

(30) Foreign Application Priority Data

Dec. 28, 2000 (JP) ............................. 2000-403303

(51) Int. Cl.
G06Q 30/00 (2006.01)
G06F 17/30 (2006.01)

(52) U.S. Cl. .......................................... 705/26; 705/27

(58) Field of Classification Search ............. 705/26–27, 705/1, 14; 715/200
See application file for complete search history.

(56) References Cited

U.S. PATENT DOCUMENTS 4,873,643 A * 10/1989 Powell et al. ............... 700/103
5,873,605 A * 2/1999 Kaplan ........................ 283/71
6,058,417 A * 5/2000 Hess et al. ................... 709/219
6,067,384 A * 5/2000 Manickam et al. .......... 382/250
6,085,126 A * 7/2000 Mellgren et al. ............. 700/233
6,965,451 B1 * 11/2005 Ogg et al. .................... 358/1.8

(Continued)

FOREIGN PATENT DOCUMENTS

JP      A 11-160851      6/1999

(Continued)

OTHER PUBLICATIONS iPrint.com Offers Custom-Printing Services and Free Business Cards to FreeAgent.com Users.Business Wire, p. 0020, Nov. 11, 1999. [recovered from Dialog search on Feb. 25, 2008].*

(Continued)

Primary Examiner—Matthew S. Gart
Assistant Examiner—William J. Allen
(74) Attorney, Agent, or Firm—Oliff & Berridge, PLC

(57) ABSTRACT

As a server computer receives, in a communication portion, data on an appearance of a custom-made product, such as a stamp, from a purchaser computer, a preview image creating portion creates smaller-sized preview image data than normal image data to be used when a stamp is produced by a stamp producing device connected to a supplier computer. The created preview image data is transmitted from the communication portion to the purchaser computer and the supplier computer, as required, and displayed on respective browsers. Therefore, the purchaser of the custom-made product can be promptly view the preview image of the custom-made product.

15 Claims, 18 Drawing Sheets

U.S. PATENT DOCUMENTS

2002/0007322 A1* 1/2002 Stromberg ................... 705/26
2002/0067500 A1* 6/2002 Yokomizo et al. .......... 358/1.15
2002/0103698 A1* 8/2002 Cantrell ....................... 705/14
2003/0140017 A1* 7/2003 Patton et al. ................ 705/410
2006/0174199 A1* 8/2006 Soltis et al. ................. 715/700

FOREIGN PATENT DOCUMENTS

WO        WO02/29657 A1     4/2002

OTHER PUBLICATIONS

In the cards. Sostrom, Carolyn. Link—up, v17n1, p. 27, Jan./Feb. 2000 [recovered from Dialog search on Feb. 25, 2008].*

New Application, Aug. 22, 2002, Fuwa et al.

U.S. Appl. No. 09/963,489, filed Sep. 27, 2001, Fuwa.

Masayoshi Nakamura, "An actual application using ActiveX and ASP", Interface, vol. 24, No. 1, pp. 130-144, CQ Publishing Co., Ltd., 1998 w/abstract.

Douglas Lake, "American data marketing: individual email will become the strongest weapon for E commerce", Nikkei Multimedia for Business, No. 39, Nikkei Bussiness Publication, Inc., 1998 w/abstract.

* cited by examiner

FIG.2

| SUPPLIER NAME (ID) | | | | | | 91c |
|---|---|---|---|---|---|---|
| PRODUCT NO. | SIZE | GRIP COLOR | INK COLOR | TEMPLATE NO. | SALES PRICE | |
| | | | | | | |
| | | | | | | |
| | | | | | | |

FIG.3

| SUPPLIER NAME (ID) | | |
|---|---|---|
| NO. | PRODUCT NO. | DISTINCTION CODE |
|  |  |  |
|  |  |  |
|  |  |  |
|  |  |  |

WORK STATUS CONFIRMATION    ORDER NO.:0000-0000-0000    DATE ORDERED: SEPT. 28, 2000    [REGISTER] [RETURN]    15:30

| ITEMS | CHECK | DATE |
|---|---|---|
| DATE OF ORDER CONFIRMED | ☑ | SEPT. 28, 2000 |
| DELIVERY DATE | | OCT. 7, 2000 |
| ORDER CONFIRMATION/DELIVERY DATE NOTIFICATION | ☑ | SEPT. 28, 2000 |
| FIRM ORDER PLACED | ☑ | SEPT. 29, 2000 |
| ORDER CANCELLED | ☐ | |
| STAMP CREATION COMPLETED | ☑ | SEPT. 30, 2000 |
| DUE DATE FOR PAYMENT | | NOV. 7, 2000 |
| DELIVERY COMPANY | | ○○×○△ |
| DELIVERY TIME DESIGNATED | | NIGHTTIME |
| PAYMENT METHOD | | PAYMENT ON DELIVERY |
| PACKAGE NO. | | 47-0822-44731 |
| STAMP DISPATCH COMPLETED | ☑ | NOV. 11, 2000 |
| MONEY RECEIVED ON DELIVERY | ☐ | |
| REMIND TO PAY | ☐ TIME(S) | |
| POSTING ON UNDESIRABLE CUSTOMER LIST | ☑ | NOV. 19, 2000    REASON [CANNOT CONTACT THE PERSON BY CALLING THE CONTACT TELEPHONE NUMBER] |

FIG.5

| UNDESIRABLE CUSTOMER LIST | | | | | |
|---|---|---|---|---|---|
| NARROW DISPLAYED CONTENTS BY ADDRESS (JAPANESE ADMINISTRATIVE DIVISIONS) OF [NOT DESIGNATED ▼] AND DISPLAY RESULTS. | | | | | [RETURN] |
| | | | | | [SEARCH] |
| CUSTOMER ID | NAME | COMPANY NAME/ SECTION NAME | ADDRESS (JAPANESE ADMINISTRATIVE DIVISIONS) | DEALER NAME | REASON FOR POSTING ON UNDESIRABLE CUSTOMER LIST |
| xxx@XXX.co.jp | ○○ ○○ | | AICHI PREFECTURE | NAGOYA STAMP SHOKAI | CANNOT CONTACT THE PERSON BY CALLING THE CONTACT TELEPHONE NUMBER |
| yyy@XXX.co.jp | | ○× INSURANCE COMPANY | WAKAYAMA PREFECTURE | OSAKA STAMP KOBO | PERSON IN CHARGE LEFT THE COMPANY AND CANNOT COLLECT BILL |
| zzz@XXX.co.jp | ○○ ○○ | | KANAGAWA PREFECTURE | TOKYO STAMP | CANNOT CONTACT THE PERSON BY CALLING THE CONTACT TELEPHONE NUMBER |

FIG.7

PLEASE INPUT YOUR ID AND PASSWORD.

ID: ☐

PASSWORD: ☐

[LOG IN]   [CANCEL]

FIG.8

PLEASE DESIGNATE YOUR HANDLING PRODUCTS.

| SIZE/GRIP COLOR | INK COLOR | | | | |
|---|---|---|---|---|---|
| | BLACK | RED | BLUE | BRIGHT RED | GREEN |
| 2260/GRAY | | | | | |
| 2260/TRANSLUCENT | | | | | |
| 2270/GRAY | | | | | |

[REGISTER]   [CANCEL]

FIG.11

PLEASE SELECT CATEGORY/SUB-CATEGORY.

○ BUSINESS                     ○ PERSONAL

| SELECT SUB-CATEGORY. ▽ |     | SELECT SUB-CATEGORY. ▽ |

○ SEASONAL                     ○ FAMILY

| SELECT SUB-CATEGORY. ▽ |     | SELECT SUB-CATEGORY. ▽ |

[SEND]          [CANCEL]

FIG.12

PLEASE SELECT ANY TEMPLATE

PERSONAL TYPE

| A-01 | A-02 | A-03 | A-04 |
|---|---|---|---|
| [label image] | [label image] | [label image] | [label image] |
| 14mm X 38mm | 18mm X 50mm | 38mm X 14mm | 50mm X 18mm |
| 1,500 YEN | 2,000 YEN | 1,500 YEN | 2,000 YEN |

NEXT  CANCEL

FIG.14

TEMPLATE NO.: A-01
SIZE: 14mm X 38mm
GRIP COLOR: ○GRAY ○TRANSLUCENT
INK COLOR: ○BLACK ○RED ○BLUE ○BRIGHT RED ○GREEN
NUMBER ORDERED: 1 ▽ PIECE(S)
*FONT TO BE DESIGNATED AFTER STAMP FACE CHECK 807-0185 (POSTAL CODE INPUT EXAMPLE)

△□△□HEIGHTS 3-6 OO-KU, KITAKYUSHU-SHI, FUKUOKA-KEN (ADDRESS INPUT EXAMPLE)

NO. 504 (ROOM NUMBER INPUT EXAMPLE)

TARO YAMADA (NAME INPUT EXAMPLE)

00-1234-5678 (PHONE NUMBER INPUT EXAMPLE)

[RESET]  [CHECK STAMP FACE]
[RETURN TO TEMPLATE SELECTION]

FIG. 17

(a) A NEW STAMP HAS BEEN ORDERED. PLEASE MAKE AN ACCESS TO http:www.xxxx.co.jp/OOO/OOOO TO ENTER DELIVERY DATE.

(b) THE STAMP WITH ORDER NO. OOOOO WILL BE DELIVERED TO THE DESIGNATED ADDRESS ON (MONTH, DAY). UPON CONFIRMATION, PLEASE REPLY TO THIS MAIL. YOUR PASSWORD IS OOOOO.

(c) CONFIRMATION MAIL HAS BEEN RECEIVED FROM THE CUSTOMER WITH ORDER NO. OOOOO. PLEASE DOWNLOAD NORMAL IMAGE DATA TO PRODUCE THE STAMP. AFTER COMPLETION OF THE STAMP CREATION, PLEASE MAKE AN ACCESS TO http://www.xxxx.co.jp/OOO/OOOO TO ENTER THE COMPLETION OF STAMP CREATION.

(d) YOUR ORDERED STAMP WITH ORDER NO. OOOOO HAS BEEN DISPATCHED. THE STAMP WILL BE DELIVERED TO THE DESIGNATED ADDRESS AS SCHEDULED ON (MONTH, DAY).

FIG.18

| CONFIRMATION OF ORDER CONTENTS → TO WORK STATUS CONFIRMATION SCREEN | | | RETURN |
|---|---|---|---|
| ORDER NO.: 0000-0000-0000   DATE ORDERED : SEPT 28, 2000  15:30 | | | |
| CUSTOMER MANAGEMENT | A000000001 | | |
| CUSTOMER NAME | TARO OSAKA | | |
| 01 | TEMPLATE NO. | OWA-1000-001 | STAMP FACE THUMBNAIL   DOWNLOAD |
| | CHARACTER STRINGS | TARO OSAKA<br>□□ HEIGHTS NO. 1007, 8-2 XXX,<br>CHUO-KU, OSAKA-SHI,<br>500-0001<br>PHONE: 00-6543-2109 | [stamp image]<br>500-0001<br>□O□ HEIGHTS NO. 1007, 8-2 XXX<br>CHUO-KU  OSAKA-SHI<br>TARO  OSAKA<br>PHONE 00-6543-2109 |
| | FONT TO BE USED | DF REISHO FONT TYPE | |
| | INK COLOR | BLACK | |
| | GRIP COLOR | TRANSLUCENT | |
| | NUMBER ORDERED | 1 | |

CUSTOM-MADE PRODUCT SALES SYSTEM AND METHOD

BACKGROUND OF THE INVENTION

1. Field of the Invention

The invention relates to a custom-made product sales system for selling custom-made products, such as stamps and business cards, using a communication network.

2. Description of the Related Art

Recently, in association with developments in computer network technology, in which the Internet is a representative example, GUI (graphical user interface) based electronic transactions using the WWW (World Wide Web), especially mail-order business between retailers (sellers) and consumers (purchasers), are actively performed. By using the WWW for the mail-order business, purchasers benefit because they can buy products promptly and be satisfied after checking sample images of many products on a Web browser. Sellers benefit because they can receive orders cheaply from a broad geographic range of consumers.

SUMMARY OF THE INVENTION

When custom-made products, such as stamps and business cards, whose appearances differ according to orders are sold in the above-described mail-order business using the WWW, purchasers would have feelings that the actual finished products greatly differ from their expectations.

For custom-made products, such as stamps and business cards, image data to be used for producing actual products (hereinafter referred to as the "normal image data") needs to be generated, as an order from a purchaser is received, so that it is considered to use the normal image data also as the preview image data. However, the normal image data is a relatively high-resolution data and the amount of the data becomes large because the normal image data is used for printing by a printer or making plates for printing blocks. Therefore, when the normal image data is used as the preview image data, considerable length of time is required for the data transmission and reception and an preview image cannot be displayed quickly on a display of a purchaser's computer.

Accordingly, it is an objective of the invention to provide a custom-made product sales system, custom-made product sales method and server used for selling custom-made products that enable purchasers of custom-made products to view preview image promptly.

In order to achieve the above-described objectives, there is provided a custom-made product sales system for selling a custom-made product using a communication network. The custom-made product sales system of the invention includes a receiving device that receives data on an appearance of the custom-made product from a communication terminal of a purchaser who buys the custom-made product, a preview image creating device that creates preview image data for the custom-made product based on the data received by the receiving device, the preview image data being more simplified smaller-sized image data than normal image data that is used when the custom-made product is produced by a supplier who produces the custom-made product, and a first transmitting device that transmits the preview image data created by the preview image creating device to the communication terminal of the purchaser.

According to the invention, the preview image data is transmitted to the communication terminal of the purchaser, as more simplified smaller-sized data than the normal image data, so that the purchaser can be promptly view the preview image. The preview image data is created at a location other than the communication terminal of the purchaser, so that heavy loads are not applied to the communication terminal of the purchaser. Moreover, the purchaser can create the preview image without preparing a program for creating preview image data. In the invention, any well-known networks such as the Internet, LANs (Local Area Network), and WANs (Wide Area Network) may be used as the communication network.

BRIEF DESCRIPTION OF THE DRAWINGS

FIG. 2 is a chart showing an example of contents of a product information database shown in FIG. 1;

FIG. 3 is a chart showing an example of contents of a handling product database shown in FIG. 1;

FIG. 4 is a chart showing an example of contents of an order management database shown in FIG. 1;

FIG. 5 is a chart showing an example of contents of an undesirable customer list contained in a customer management database shown in FIG. 1;

FIG. 7 is a schematic view showing an example of a screen displayed in a browser of a client in one step of the handling product registration processes;

FIG. 8 is a schematic view showing an example of a screen displayed in the browser of the client in one step of the handling product registration processes;

FIG. 11 is a schematic view showing an example of a screen displayed in the browser of the client in one step of the processes for displaying the handling product information page;

FIG. 12 is a schematic view showing an example of a screen displayed in the browser of the client in one step of the processes for displaying the handling product information page;

FIG. 14 is a schematic view showing an example of a screen displayed in the browser of the client in one step of the stamp ordering processes;

FIG. 17 is a schematic view showing examples of screens displayed in a mailer of a supplier or a purchaser in one step of the post-stamp-ordering processes; and FIG. 18 is a schematic view showing an example of a screen displayed in the browser of the supplier in one step of the post-stamp-ordering processes.

DETAILED DESCRIPTION OF THE EMBODIMENT

A preferred embodiment of the invention will be described with reference to the drawings.

Figure 1:
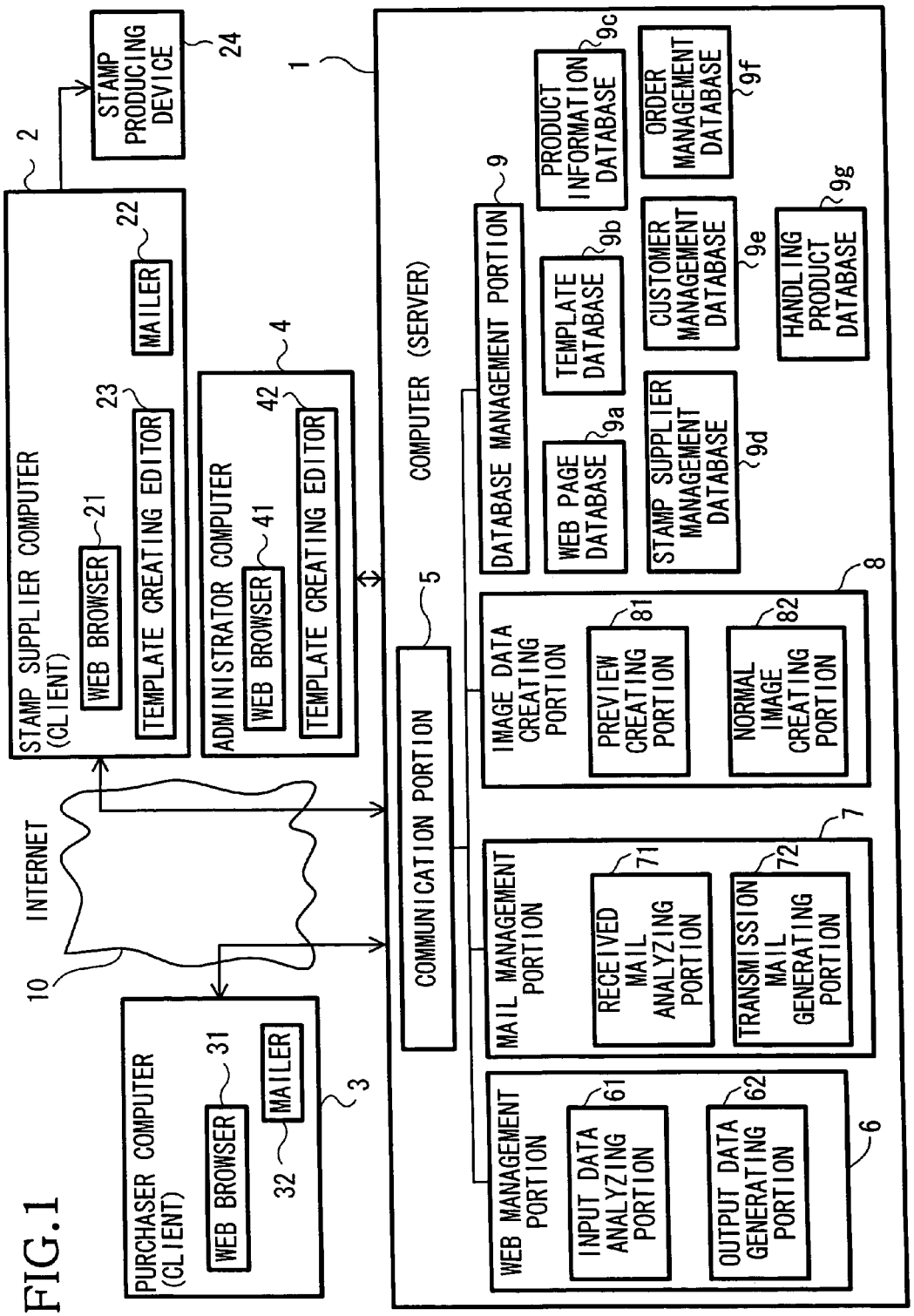
FIG. 1 is a block diagram showing a custom-made product sales system according to an embodiment of the invention.

FIG. 1 is a block diagram showing a stamp sales system which is a custom-made product sales system according to an embodiment of the invention. The system provides product information about products handled by stamp suppliers (retailers) whose Web pages are viewed by consumers, to stamp purchasers. The stamp sales system includes a computer 1 that functions as a server for an electronic shopping mall system in which a plurality of virtual stores of suppliers join, a stamp supplier computer 2 that is a client of the computer 1, a stamp purchaser computer 3 that is also a client of the computer 1, and an administrator computer 4 that performs system controls for the computer 1. The computers 1, 2, 3 are connected to each other to enable mutual data communication through the Internet 10. Although FIG. 1 shows only one stamp supplier client computer 2 and one stamp purchaser client computer 3, all stamp supplier and stamp purchaser computers connected to the Internet 10 could be clients.

The server computer 1 includes a communication portion 5 (receiving device, first transmission device, second transmission device) that performs data transmission and reception with the computers 2, 3, using a protocol conforming with the Internet 10, a Web management portion 6 that manages transmission and reception of a Web page written in a HTML (Hyper Text Markup Language) via the Internet 10 using a HTTP (Hyper Text Transfer Protocol), a mail management portion 7 that manages transmission and reception of mail written in the HTML and/or text, via the Internet 10 using a SMTP (Simple Mail Transfer Protocol) and a POP (Post Office Protocol), an image data creating portion 8 that creates preview image data for a stamp face, a database management portion 9 that manages databases 9a, 9b, 9c, 9d, 9e, 9f, 9g, which are described below, a Web page database 9a that stores HTML files for Web pages to be transmitted to the computers 2, 3, a template database 9b that stores files concerning stamp face designs (templates), a product information database 9c that stores information about products, such as product ink colors, a stamp supplier management database 9d that stores information about stamp supplies who are registered in the server, a customer management database 9e that stores information about customers who have ordered in the past, an order management database 9f that stores information about status of orders from customers, and a handling product database 9g that stores information about products that each stamp supplier handles.

The Web management portion 6 includes an input data analyzing portion 61 and an output data generating portion 62. The input data analyzing portion 61 analyzes a content of data supplied through the communication portion 5, via the Internet 10, based on the HTTP. In this embodiment, the input data analyzing portion 61 can determine whether purchasers who have ordered products have passwords associated with their IDs. The output data generating portion 62 generates, using a CGI (common gateway interface) application, HTML data that is transmitted from the communication portion 5 based on the HTTP and supplied to the computers 2, 3, in accordance with the analysis results of the input data analyzing portion 61.

The mail management portion 7 includes a received mail analyzing portion 71 and a transmission mail generating portion 72. The received mail analyzing portion 71 analyzes contents of email messages supplied through the communication portion 5 to the mail management portion 7, via the Internet 10, based on the POP. The transmission mail generating portion 72 generates email messages that are supplied through the communication portion 5 to the computers 2, 3, based on the SMTP. In this embodiment, when the database management portion 9 detects that the order management database 9f has been updated, the transmission mail generating portion 72 generates, according to updating steps, an email message to inform at least one of a supplier and a purchaser of updated work status. Further, when the input data analyzing portion 61 detects that an order has been received from a purchaser who does not have a password, the transmission mail generating portion 72 issues a password to the purchaser and generates an email message including the password.

The image data creating portion 8 includes a preview creating portion (preview image creating device) 81 and a normal image creating portion (normal image creating device) 82. The preview creating portion 81 creates a preview image data on a stamp face at approximately 90 dpi, by changing an address and a name written on a stamp face in a template designated by a customer, to the customer's address and name. The normal image creating portion 82 creates normal image data to be used when a stamp supplier produces a stamp, at approximately 600 dpi. In other words, in this embodiment, the preview image created by the preview creating portion 81 is showed to the supplier or the purchaser as a thumbnail that is smaller and simpler than a normal image. Accordingly, the communication time between the server, and the supplier or the purchaser can be reduced when compared with the time when a high-resolution normal image is transmitted.

The database management portion 9 extracts required data from the Web page database 9a, the template database 9b, the product information database 9c, the stamp supplier management database 9d, the customer management database 9e, the order management database 9f, the handling product database 9g. The database management portion 9 controls rewriting in each database 9a, 9b, 9c, 9d, 9e, 9f, 9g.

Figure 10:
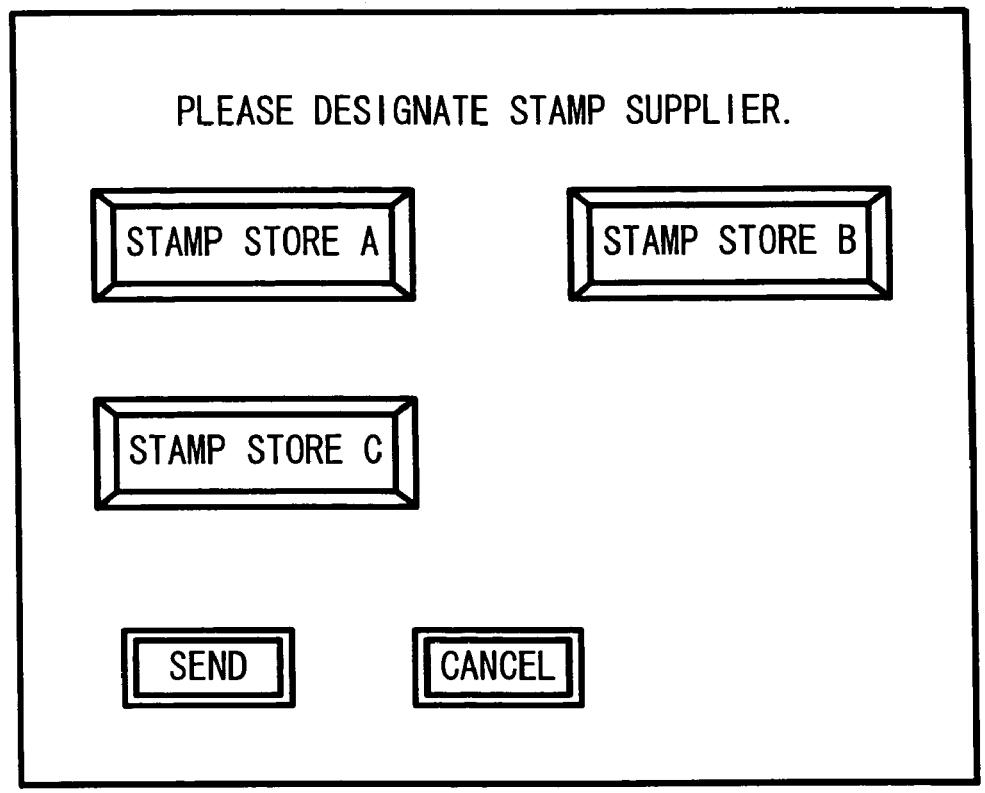
FIG. 10 is a schematic view showing an example of a screen displayed in a browser of a client in one step of the processes for displaying the handling product information page.

The Web page database 9a stores HTML files that are transmitted to the purchaser computer 3 in respective stamp ordering steps and displayed by a browser as shown in, for example, FIGS. 10 to 12, and HTML files that are transmitted to the stamp supplier computer 2 in respective handling product selection steps and displayed by a browser as shown in, for example, FIGS. 7 and 8. The HTML files stored in the Web page database 9a may be rewritten by the output data generating portion of the Web management portion 6, as necessary.

The template database 9b stores information about templates (such as sample images of stamp faces, sizes, sales prices, and layout frames), in association with predetermined template numbers (e.g., A-02 and A-03).

The product information database 9c is classified broadly into categories (such as business, personal, seasonal, and family). Each category is classified into sub-categories (e.g., office and sales for the business category). As shown in FIG. 2, product information data 91c, 92c, 93c is stored in areas of the sub-categories in each category, according to the stamp suppliers in association with stamp supplier IDs (Identifiers). Each product information data 91c, 92c, 93c is created by associating product information (such as a stamp face size, grip color, ink color, template number, and sales price) with a product number.

The product information data 91c, 92c, 93c is provided by a system administrator to each stamp supplier. To facilitate data creation and management by the system administrator, the product information data with the same data structure is supplied to the stamp suppliers. When a new product is added to the product information data 91*c*, 92*c*, 93*c*, the system administrator may initially set the sales price of the product. This may eliminate the need for the stamp supplier to input sales prices, so that stamp supplier's inputting loads can be reduced. A structure such that the stamp supplier can change the initially set sales prices may be employed. Accordingly, the stamp supplier can change suggested sales prices at any time, as necessary.

The stamp supplier management database 9*d* stores the name of a stamp supplier, name of a person in charge, address, telephone number, and password, in association with an ID (Identifiers) of the stamp supplier who is registered in the server. When a new stamp supplier is to be registered in the server, the database management portion 9 adds and registers the stamp supplier in the stamp supplier management database 9*d*, with the ID of the stamp supplier who is newly registered and its password being associated with each other.

The customer management database 9*e* stores information about customers who have ordered in the past (such as name, age, gender, and address), in association with IDs, which serve as identifiers for the customers. When a new customer who has not placed an order in the past, orders, the database management portion 9 adds and registers the customer in the customer management database 9*e*, with the ID of the new customer associated with the customer information. As the customer information to be stored in the customer management database 9*e*, information that indicates whether a customer caused any troubles in the past when the customer purchases a product, may be added. Such information is stored as undesirable customer list data. As the customer IDs, email addresses that the customers have may be adopted. This can save the server from having to issue the IDs. Further, the customer IDs and email addresses do not have to be stored redundantly. As the customer IDs and passwords, a cookie file that is transmitted from the server computer 1 and stored in the purchaser computer 3, may be used. This can save purchasers from having to input the IDs and passwords.

The order management database 9*f* stores each order number and information about orders (such as date ordered, product number, and dispatched or not), in association with each other. FIG. 4 shows an example of items in the information about an order (work status confirmation information) stored in the order management database 9*f* in association with one order number. In the example of FIG. 4, the items in the work status confirmation information include data of order confirmed, delivery date, due date for payment, delivery company, package no., stamp dispatch completed, and so on. Among the items in the work status confirmation information, some items, such as date of order confirmed and firm order placed, are work status check items for which a checkmark is input by the stamp supplier in a checkbox by operating the computer 2. Other items do not require checkmark input. For some of the items, dates related to respective items are input automatically or manually by the supplier. For example, when the input to the checkbox is performed and REGISTER button is pressed by a mouse click, a record of the relevant order number in the order management database 9*f* is updated according to the input work status confirmation information.

In this embodiment, the work status confirmation information in the order management database 9*f* includes a checkbox for determining whether the supplier posts a customer associated with an order number, on an undesirable customer list. This allows the supplier to determine whether the supplier posts the customer on the undesirable customer list while confirming the work status confirmation information about the order.

The handling product database 9*g* is classified broadly into categories. Each category is classified into sub-categories. As shown in FIG. 3, distinction data 91*g*, 92*g*, 93*g* is stored in areas of the sub-categories in each category, according to the stamp suppliers in association with the stamp supplier IDs. Each distinction data 91*g*, 92*g*, 93*g* is created by associating the product number and a distinction code for distinguishing between the handling products and non-handling products, with a number. The number is used in processes for displaying a handling product information page, which will be described below, to select a product subjected to determination between a handling product and a non-handling product (see steps S211 to S214 in FIG. 9). The number is given sequentially from 1. For example, "1" is assigned, as distinction data, to products that a stamp supplier handles, and "0" is assigned, as distinction data, to products that the stamp supplier does not handle.

In this embodiment, the database management portion 9 detects whether the work status confirmation information of each record in the order management database 9*f* is updated, and whether a new record is generated in the order management database 9*f*. When the database management portion 9 detects that the work status confirmation information is updated or a new record is generated, a signal indicating that the work status confirmation information is updated or a new record is generated, is provided to the transmission mail generating portion 72. The transmission mail generating portion 72 generates an email message that has contents corresponding to updating steps and that is addressed to the supplier and/or the purchaser.

When a new order of a product is placed, the database management portion 9 generates a new record in accordance with the order in the order management database 9*f*. When a new record is generated in the order management database 9*f*, it is informed to the transmission mail generating portion 72 that a new record is generated in the order management database 9*f*. Thereafter, the transmission mail generating portion 72 generates an email message for informing a stamp supplier associated with the order that a new record has been created in the order management database 9*f*, that is, an order for a stamp is placed with the supplier. When a new record is created in the order management database 9*f*, the transmission mail generating portion 72 generates an email message addressed to the purchaser to give an address of thanks for the order.

The database management portion 9 manages the undesirable customer list data stored in the customer management database 9*e* such that the undesirable customer list data can be viewed on the computers 2 of all suppliers joining the electronic shopping mall. More specifically, when the supplier IDs, which are input from the supplier computers 2, and the passwords are valid, the undesirable customer list data stored in the customer management database 9*e* is transmitted to all of the supplier computers 2 and displayed on browsers 21. Accordingly, the suppliers can obtain the information, such as the names of purchasers who are subjected to be placed on the undesirable customer list by other suppliers, so that security in business dealings for the suppliers joining the electronic shopping mall can be enhanced. FIG. 5 shows an example of the undesirable customer list displayed on the browser 21 of the supplier computer 2. In the example of FIG. 5, the IDs and names of the customers included in the undesirable customer list are shown in a list format. Results of search performed by narrowing people listed on the undesirable customer list using their address can be shown.

The client supplier computer 2 is installed with the browser 21, which is Web viewing software, and a mailer 22, which is mail transmission and reception software, as well as a template creating editor 23 for a stamp supplier who is an owner of the computer 2 to create templates for their own stamp faces. The computer 2 is connected to a stamp producing device 24. The stamp producing device 24 is for producing a stamp with characters and the like on a stamp face corresponding to the order received from the computer 3 through the computer 1. When a stamp is produced using the stamp producing device 24, the normal image data created by the normal image creating portion 82 and downloaded from the computer 1 is used.

The client purchaser computer 3 is installed with a browser 31, which is Web viewing software, and a mailer 32, which is mail transmission and reception software.

The administrator computer 4 is installed with a browser 41, which is Web viewing software, as well as a template creating editor 42 for the system administrator to create templates for stamp faces to be provided to the stamp suppliers.

Next, various processes performed in the custom-made product sales system having the above-described structures are described with reference to the drawings.

Figure 6:
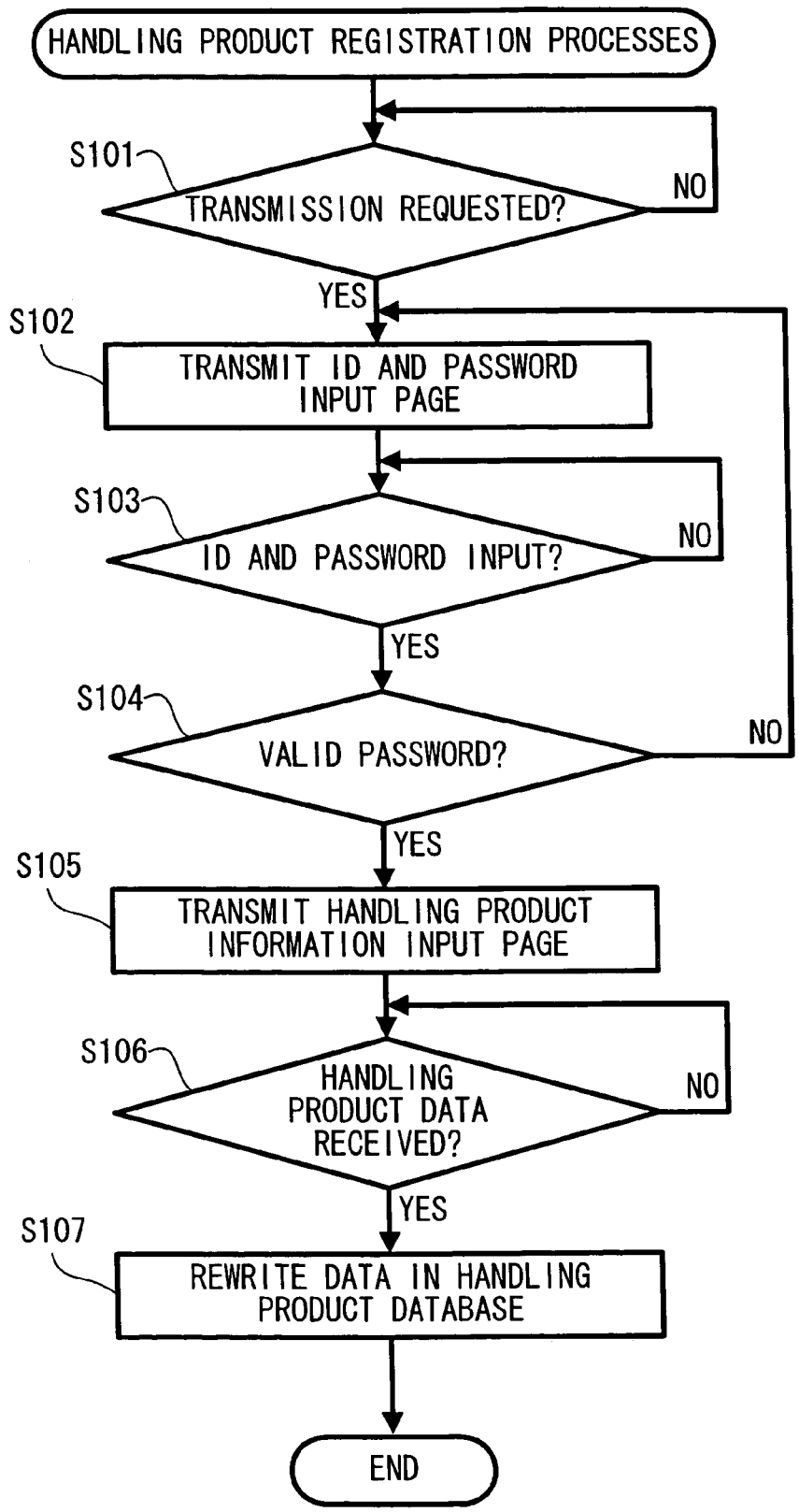
FIG. 6 is a flowchart showing handling product registration processes in terms of server operations.

First, processes for registering handling products in the handling product database 9g are described with reference to FIGS. 6 to 8. FIG. 6 is a flowchart showing the handling product registration processes in terms of server operations. FIGS. 7 and 8 are schematic views showing examples of pages displayed in the browser 21 of the supplier computer 2 in one step of the handling product registration processes.

In step S101, the input data analyzing portion 61 of the Web management portion 6 determines whether transmission of a Web page for asking a stamp supplier to input an ID and password is requested. When the transmission is requested (S101:YES), flow goes to the process in step S102.

In step S102, a file to display, on the browser 21 of the supplier computer 2, an ID and password input page shown in FIG. 7 is extracted from the Web page database 9a by the database management portion 9, and transmitted from the communication portion 5 to the computer 2.

Accordingly, the ID and password input page is displayed on the Web browser of the computer 2. In the ID and password input page, the stamp supplier inputs the ID and password. After input, the stamp supplier clicks on "LOG IN" button. Accordingly, data on the ID and password is transmitted from the computer 2 to the computer 1.

In step S103, the input data analyzing portion 61 of the Web management portion 6 of the computer 1 determines whether the data on the ID and password is received from the computer 2. When the data on the ID and password is received from the computer 2 (S103:YES), flow goes to the process in step S104.

In step S104, the input data analyzing portion 61 of the Web management portion 6 further determines whether the input password is valid, based on the IDs stored in the stamp supplier management database 9d and the passwords associated with the IDs. When it is determined that the password is invalid (S104:NO), flow returns to the process in step S102, and the processes in steps S102 to S104 are performed again. When it is determined that the password is valid (S104:YES), flow goes to the process in step S105.

In step S105, a file to display, on the browser 21 of the supplier computer 2, a handling stamp information input page shown in FIG. 8, is extracted from the Web page database 9a by the database management portion 9, and transmitted from the communication portion 5 to the computer 2.

FIG. 8 is an example of the page to be used by the stamp supplier when selecting stamp types (sizes, grip colors, and ink colors) that the stamp supplier handles. The page is structured such that "size/grip color" and "ink color" of stamps can be selected.

Then, the handling stamp information input page is displayed on the Web browser of the computer 2. In the handling stamp information input page, the stamp supplier selects the sizes, grip colors, and ink colors of their handling products by clicking on the applicable boxes for the size/grip color and ink color. After selection, the stamp supplier clicks on REGISTER button. Accordingly, handling product data for distinguishing between products that the stamp supplier handles and does not handle, is transmitted from the computer 2 to the computer 1.

In step S106, the input data analyzing portion 61 of the Web management portion 6 determines whether the handling product data is received from the computer 2. When the handling product data is received from the computer 2 (S106: YES), flow goes to the process in step S107.

In step S107, the database management portion 9 changes, based on the stamp supplier ID received in step S103 and the handling product data received in step S106, the distinction data 91g, 92g, 93g stored in the handling product database 9g and associated with the stamp supplier ID. That is, the database management portion 9 sets "1" for the distinction code associated with the product number of a product, for which clicking is performed, in the distinction data associated with the stamp supplier ID.

Each distinction data 91g, 92g, 93g in the handling product database 9g is created by each process in the above-described steps S101 to S107, such that the handling products of the stamp supplier can be distinguished.

Figure 9:
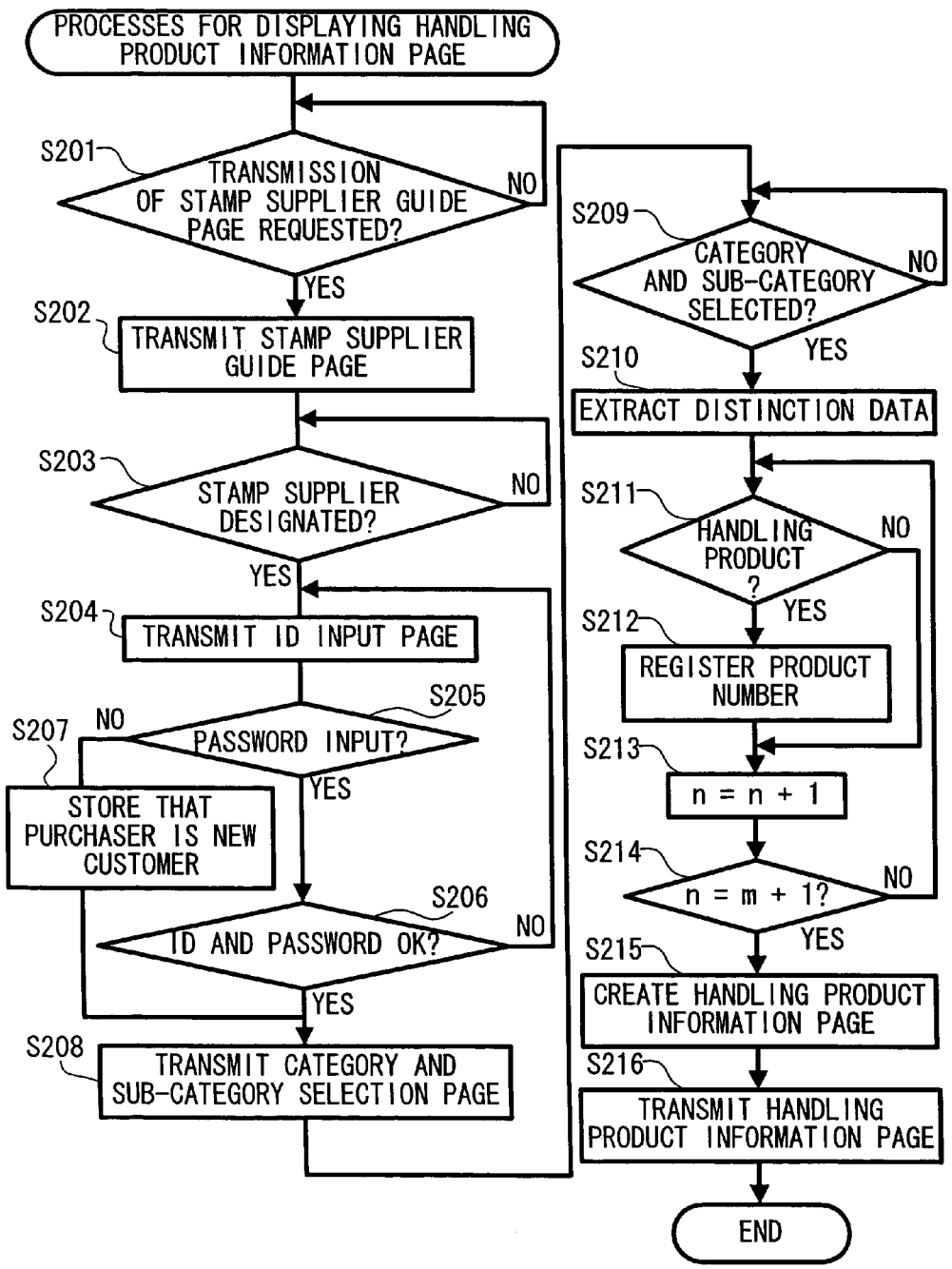
FIG. 9 is a flowchart showing processes for displaying a handling product information page in terms of server operations.

Next, processes for displaying a handling product information page on the Web browser 31 of the purchaser computer 3 will be described with reference to FIGS. 9 to 12. FIG. 9 is a flowchart showing processes for displaying the handling product information page in terms of server operations. FIGS. 10 to 12 are schematic views showing examples of pages displayed in the browser 31 of the purchaser computer 3 in one step of the processes for displaying the handling product information page.

In step S201, the input data analyzing portion 61 of the Web management portion 6 determines whether transmission of a Web page for asking a purchaser to designate a stamp supplier is requested. When the transmission is requested (S201: YES), flow goes to the process in step S202.

In step S202, a file to display, on the browser 31 of the purchaser computer 3, a stamp supplier guide page shown in FIG. 10 is extracted from the Web page database 9a by the database management portion 9, and transmitted from the communication portion 5 to the computer 3.

Then, the stamp supplier guide page is displayed on the Web browser of the computer 3. In the stamp supplier guide page, the purchaser selects a desired stamp supplier by clicking on a button for the stamp supplier. After selection, the purchaser clicks on SEND button. Accordingly, data on the designated stamp supplier is transmitted from the computer 3 to the computer 1.

In step S203, the input data analyzing portion 61 of the Web management portion 6 of the computer 1 determines whether the data on the designated stamp supplier is received from the computer 3. When the data on the stamp supplier is received from the computer 3 (S203:YES), flow goes to the process in step S204.

In step S204, a Web page for prompting the input of an ID (email address) and password, is transmitted from the computer 1 to the purchaser computer 3. In this embodiment, a person who has placed an order in the past has a password.

Then, in step S205, the input data analyzing portion 61 of the Web management portion 6 determines whether data replied from the purchaser with respect to the Web page transmitted in step S204 includes a password other than the ID.

When it is determined that the password is input (S205: YES), flow proceeds to step S206 where the input data analyzing portion 61 determines whether the input ID and password are valid, based on the data stored in the customer management database 9e. When the input ID and password are valid (S206:YES), flow proceeds to step S208. If not (S206:NO), flow returns to step S204.

When it is determined in step S205 that the password is not input (S205:NO), flow proceeds to step S207. In step S207, it is stored in the Web management portion 6 that the purchaser associated with the input ID is a new customer who has not purchased in this electronic shopping mall in the past. After step S207 is finished, flow proceeds to step S208.

In step S208, a file to display, on the browser 31 of the computer 3, a category and sub-category selection page shown in FIG. 11, is extracted from the Web page database 9a by the database management portion 9, and transmitted from the communication portion 5 to the computer 3.

Then, the category and sub-category selection page is displayed on the Web browser 31 of the computer 3. In the category and sub-category selection page, the purchaser selects a category by clicking on a box associated with the category, as well as a sub-category using an option menu (pull-down menu) for the selected category. After selection, the purchaser clicks on SEND button. Accordingly, data on the selected category/sub-category is transmitted from the computer 3 to the computer 1.

In step S209, the input data analyzing portion 61 of the Web management portion 6 of the computer 1 determines whether the data on the selected category/sub-category is received from the computer 3. When the information about the selection of the category/sub-category is received from the computer 3 (S209:YES), flow goes to the process in step S210.

In step S210, the output data generating portion 62 extracts from the handling product database 9g the distinction data (see FIG. 3) for the designated stamp supplier, which is indicated in the data received in step S203, and belonging to the category/sub-category according to the data received in step S209, based on the stamp supplier ID. The extracted distinction data is temporarily stored in the output data generating portion 62.

In step S211, the output data generating portion 62 determines, based on the distinction data stored in step S210, whether the distinction code associated with a number "n" is "1", that is, whether a product with its product number associated with the number "n" is a handling product. When it is determined that the product is a handling product (S211: YES), flow goes to the process in step S212. When it is determined that the product is not a handling product (S211: NO), flow goes to the process in step S213. As an initial setting for "n", "1" is set.

In step S212, the product number associated with the number "n" is temporarily stored in the output data generating portion 62.

In step S213, the output data generating portion 62 increments the number "n" by one (n=n+1).

In step S214, the output data generating portion 62 determines whether the number "n" is equal to "m+1". When the number "n" is not equal to "m+1" (S214:NO), flow goes to the process in step S211 and each process in steps S211 to S213 is performed. When the number "n" is equal to "m+1" (S214: YES), flow goes to the process in step S215. "m" refers to the number of products belonging to the selected sub-category of the category, which is indicated in the data received in step S209.

Through a series of processes in the above-described steps S210 to S214, only the product numbers of the products of the designated stamp supplier, which is indicated in the data received in step S203, and belonging to the selected category/sub-category, which is indicated in the data received in step S208, are extracted and temporarily stored in the output data generating portion 62.

In step S215, the output data generating portion 62 generates HTML data on the handling product information page that shows the handling products of the designated stamp supplier, which is indicated in the data received in step S203. That is, a file for the information page is extracted by the output data generating portion 62 from the Web page database 9a. In addition, the output data generating portion 62 extracts from the product information database 9c, the product information (see FIG. 2) associated with the product numbers, based on the product numbers temporarily stored in the output data generating portion 62. Further, based on the template numbers included in the extracted product information, the information about the templates associated with the template numbers is extracted from the template database 9b. The output data generating portion 62 generates the HTML data on the handling product information page, by adding the extracted information about the templates to the information page.

In step S216, the HTML data (including sample image data of the templates) to display on the browser 31 of the purchaser computer 3, the stamp supplier's handling product information page shown in FIG. 12, is transmitted from the communication portion 5 to the computer 3 by the Web management portion 6.

Through a series of processes in the above-described steps S201 to S216, the handling product information page illustrated in FIG. 12 that only shows the handling products of the stamp supplier designated by the purchaser and belonging to the category/sub-category selected by the purchaser, is displayed on the Web browser 31 of the purchaser computer 3. Therefore, the purchaser can readily search a desired product from the stamp suppliers' handling products. Further, situations such that the stamp suppliers' non-handling products are ordered can be prevented.

FIG. 12 is an example of the page for a stamp supplier to inform purchasers of their handling stamps. A plurality of products that the stamp supplier handles are shown on the page. A stamp face sample, stamp face size, and sales price of each product are also indicated on the page. Together with such information, a grip color and ink color to be handled for each of the products may be indicated.

Figure 13:
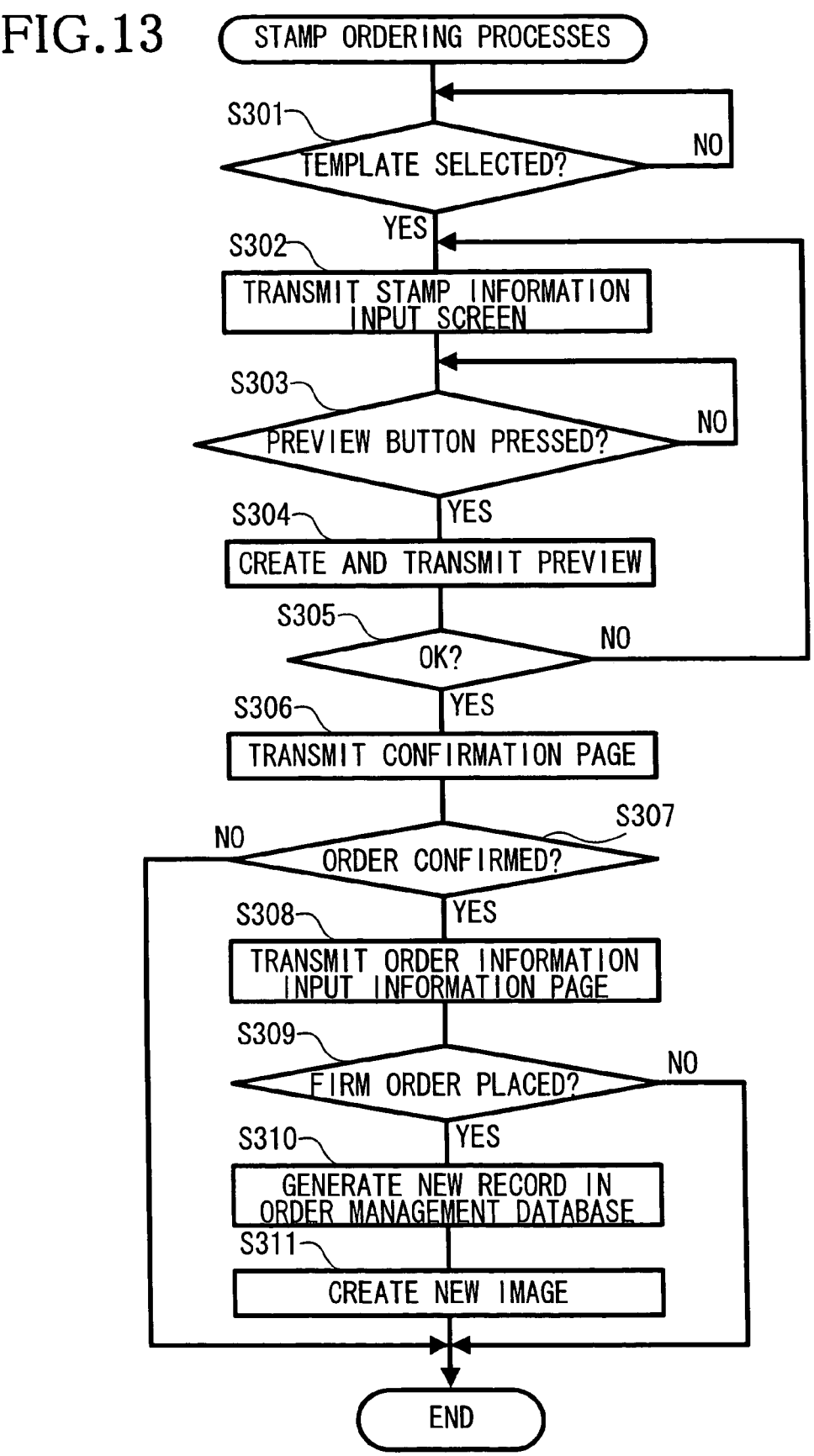
FIG. 13 is a flowchart showing stamp ordering processes in terms of server operations.
Figure 15:
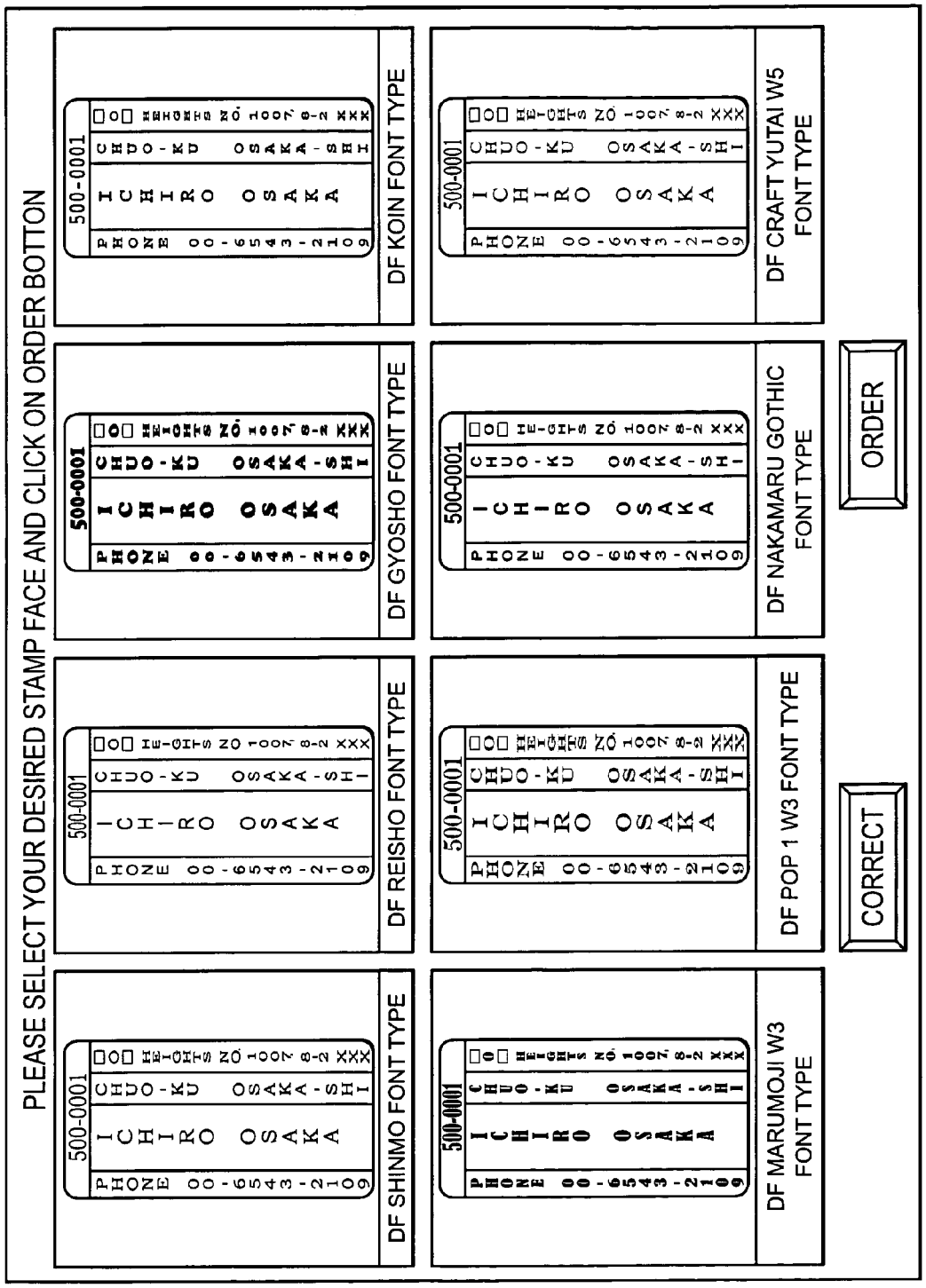
FIG. 15 is a schematic view showing an example of a screen displayed in the browser of the client in one step of the stamp ordering processes.

Next, stamp ordering processes to be performed by the purchaser subsequent to the flow shown in FIG. 9 will be described with reference to FIGS. 13 to 15. FIG. 13 is a flowchart showing stamp ordering processes in terms of processes in the server. FIGS. 14 and 15 are schematic view showing examples of pages displayed on the browser 31 of the computer 3 in one step of the stamp ordering processes.

In step S301, the input data analyzing portion 61 repeatedly determines whether a template is selected by the purchaser from a plurality of the templates displayed on the Web browser 31 of the computer 3, by clicking on a button for the desired template. What is displayed on the purchaser browser 31 is the handling product information page of a stamp supplier that is created by the processes for displaying the handling product information page shown in FIG. 9 and that only shows the templates of the products that the stamp supplier handles.

In step S302, a stamp information input screen shown in FIG. 14 is extracted from the Web page database 9a and transmitted from the communication portion 5 to the purchaser computer 3, in accordance with the HTTP. On the stamp information input screen illustrated in FIG. 14, input spaces are shown to input more specific stamp information (including grip color, ink color, number of stamps to be ordered, and character string data to be indicated on a stamp face, such as name and address) with respect to the template selected in step S301.

FIG. 14 is an example of the page to input characters and the like that the purchaser desires on the stamp face. In the page, a stamp face sample is shown. In addition, the page is structured such that the grip color, ink color, number of stamps to be ordered, and character information desired on the stamp face (postal code, address, name, and telephone number) can be selected or input. When a desired grip color is selected by the purchaser, only ink colors prepared for the desired grip color are shown in ink color selection items.

In step S303, the input data analyzing portion 61 repeatedly determines whether a preview-viewing request button displayed on the browser 31 of the purchaser computer 3 is clicked on (that is whether "CHECK STAMP FACE" button is pressed on the stamp information input screen shown in FIG. 14). When the preview-viewing request button in the browser 31 is clicked on, the communication portion 5 receives via the Internet 10, information about stamp appearances input by the purchaser on the stamp information input screen, such as that shown in FIG. 14.

In step S304, the preview creating portion 81 of the image data creating portion 8 creates an preview image data having a resolution of approximately 90 dpi, in accordance with the data input on the stamp information input screen shown in FIG. 14. The created preview image data is transmitted from the communication portion 5 to the purchaser computer 3, together with a HTML file (that may be extracted from the Web page database 9a) rewritten by the output data generating portion 62 so as to have link information for the preview image to be attached. Accordingly, the purchaser can see the preview image attached to text, so that additional information as to the preview image can be viewed at the same time.

The HTML file transmitted in step S304 to the purchaser computer 3 together with the preview image data is a file having a tag for the attached image, such as <IMG SRC="pre0001.gif">, when a file name of the preview image data is, for example, "pre0001.gif".

FIG. 15 is an indication example of the preview images and HTML files transmitted in step S304. In the example, a preview image is created in each of prescribed eight types of fonts, with respect to the template selected in step S301. A checkbox is provided in front of each of the eight font names. When ORDER button is pressed with any of the checkboxes checkmarked, the preview image in the font associated with the checkmark is selected as the stamp that the purchaser wishes to buy.

In step S305, the input data analyzing portion 61 determines whether the purchaser accepts the preview image transmitted in step S304, that is, whether ORDER button in the example of FIG. 15 is pressed with any of the checkboxes checkmarked. When it is determined that the purchaser accepts the preview image (S305:YES), flow proceeds to step S306. When the purchaser does not accept the preview image (when CORRECT button in the example of FIG. 15 is pressed) (S305:NO), flow returns to step S302 and same processes are repeated.

In step S306, an order confirmation page (including information such as the stamp template type, contents of text on the stamp face, and ink color) extracted from the Web page database 9a and rewritten by the output data generating portion 62 in accordance with the contents of the order, is transmitted to the purchaser computer 3.

In step S307, the input data analyzing portion 61 determines the contents of data transmitted from the purchaser. When data indicating the order confirmation is transmitted from the purchaser (S307:YES), flow proceeds to step S308. When data indicating the order cancellation is transmitted (S307:NO), the stamp ordering processes end.

In step S308, an order information input page (including input spaces for name and address of stamp orderer, stamp delivery address, receiving method, delivery method, and payment method, and a space for indicating stamp costs) extracted from the Web page database 9a and rewritten by the output data generating portion 62 in accordance with the contents of the order, is transmitted to the purchaser computer 3.

In step S309, the input data analyzing portion 61 determines the contents of data transmitted from the purchaser. When data indicating the firm order is transmitted from the purchaser (S309:YES), flow proceeds to step S310. When data indicating the order cancellation is transmitted (S309:NO), the stamp ordering processes end.

In step S310, a record generating portion of the database management portion 9 issues an order number and generates a new record associated with the order number in the order management database 9f. In the new record created in step S310, business transactions including work status of the stamp ordered, as shown in FIG. 4, are recorded one after another.

In step S311, upon the receipt of firm order from the purchaser, the normal image creating portion 82 of the image data creating portion 8 creates, in accordance with the data input on the stamp information input screen shown in FIG. 14, the normal image data with a resolution of approximately 600 dpi, that is used when the stamp is produced using the stamp producing device 24 connected to the supplier computer 2. Afterwards, the created normal image data is downloaded by the supplier and used for the production of the stamp with the stamp producing device 24. According to the embodiment, the supplier does not have to create the normal image data using their own computer, so that the supplier's work load can be greatly reduced.

In the stamp ordering processes that have been described with the flowchart of FIG. 13, a desired product (stamp face, size, grip color, ink color, and font) is ordered using the handling product information page showing only the products that the stamp supplier handles. Therefore, a product that a purchaser orders is definitely the stamp supplier's handling product. In addition, the purchaser can designate information to be printed on the stamp face, so that the stamp with characters, that the purchaser desires, printed can be ordered.

Figure 16A:
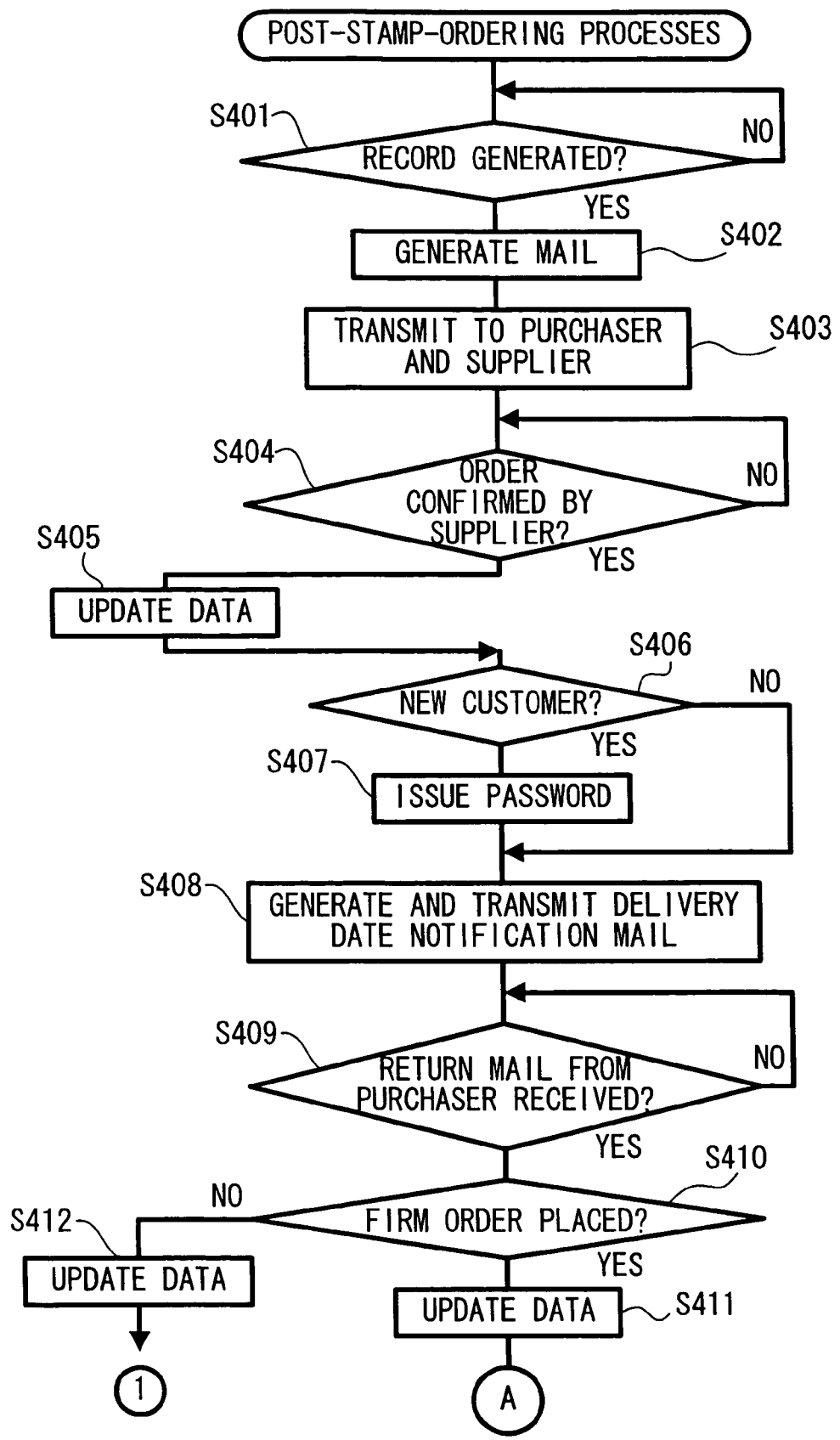
FIG. 16A is a flowchart showing post-stamp-ordering processes in terms of server operations.
Figure 16B:
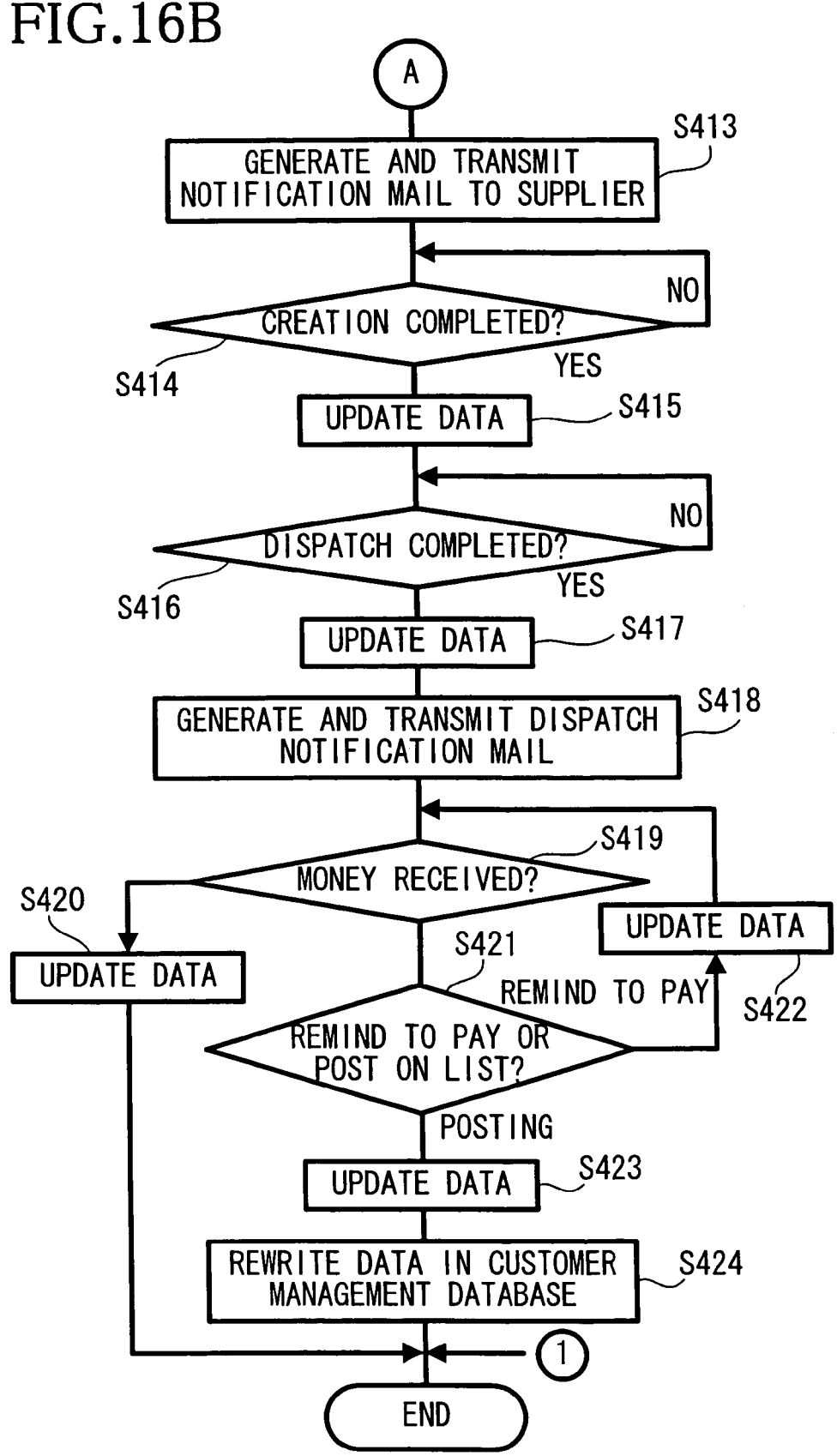
FIG. 16B is a flowchart showing the post-stamp-ordering processes in terms of server operations.

Next, post-stamp-ordering processes to be performed by the server subsequent to the flow shown in FIG. 13 will be described with reference to FIGS. 16A to 18. FIGS. 16A and 16B are flowcharts showing the post-stamp-ordering processes in terms of processes in the server. FIGS. 17 and 18 are schematic views showing examples displayed, at several steps of the post-stamp-ordering processes, on the browsers or the mailers of the computers 2, 3.

In step S401, the database management portion 9 repeatedly determines whether a new record is generated in the order management database 9f in step S301 in the FIG. 13. When a new record is generated (S401:YES), flow proceeds to step S402.

In step S402, the transmission mail generating portion 72 generates an email message for informing a new stamp order has been placed, to the stamp supplier associated with the order and for prompting the stamp supplier to input the delivery date (see FIG. 17(A)), and an email message for giving an address of thanks for the order to the purchaser and for reconfirming the order. In step S403, the email messages generated in step S402 are transmitted from the communication portion 5 to each of the supplier and the purchaser. The supplier who has read the email message transmitted from the communication portion 5 makes an access to the designated Web page to input the delivery date. After a checkmark is placed in the checkbox for ORDER CONFIRMED, REGISTER button is pressed. Entry of the delivery date and the order confirmation may be automatically performed by the server, based on the contents of the email message sent by the supplier to the server. (This applies to the relevant steps described below.) Thus, in this embodiment, it is possible to let a supplier immediately know by email messages that a purchaser ordered their product. Therefore, such an advantage is achieved that the supplier can confirm the order soon after the order is placed and start the work for the product without delay.

FIG. 18 is an example of a screen transmitted from the computer 1 to the supplier computer 2 when the supplier makes an access to the designated Web page and displayed in the browser 21 to present detailed contents concerning one order number to the supplier. In the example of FIG. 18, customer ID, customer name, template number, characters to be indicated on stamp, font, ink color, grip color, number of stamps to be ordered, and the like are presented to the supplier. The preview image created in step S304 can be displayed in the screen in FIG. 18, as the supplier presses STAMP FACE THUMBNAIL button. The supplier can download the normal image data created in step S311, to their own computer 2, as the supplier presses DOWNLOAD button displayed in the screen in FIG. 18.

In step S404, the input data analyzing portion 61 repeatedly determines whether the supplier placed a checkmark in the checkbox for ORDER CONFIRMED, based on the data transmitted from the supplier computer 2. When a checkmark is placed in the checkbox for ORDER CONFIRMED (S404:YES), the work status of the relevant record in the order management database 9f is updated in step S405.

Subsequently, in step S406, in response to the detection of the database management portion 9 that the work status has been updated in step S405, the input data analyzing portion 61 determines, based on the contents stored in step S207 in FIG. 9, that the purchaser associated with the order is a new customer who does not have a password. When the purchaser is a new customer (S406:YES), the transmission mail generating portion 72 issues a password in step S407, and then flow proceeds to step S408. When the purchaser is not a new customer (S406:NO), flow proceeds to step S408.

In step S408, the transmission mail generating portion 72 of the mail management portion 7 generates an email message for informing the purchaser of the stamp of the delivery date, based on the stored contents of the work status of the relevant record in the order management database 9f. The created email message is transmitted from the communication portion 5 to the purchaser. The contents of the email message is, as shown in, for example, FIG. 17(B), for informing the purchaser of the delivery date and for prompting the purchaser to reply to this notification mail, as a final order confirmation. When the purchaser is a new customer, a password associated with an ID of the purchaser is indicated in the notification mail. In this embodiment, a password can be automatically issued and informed to the purchaser, so that the purchaser does not feel being bothered with deciding a password by his or herself and inputting it. By using the password together with the purchaser ID, the management of purchasers who have bought in the past can be facilitated.

In step S409, the received mail analyzing portion 71 repeatedly determines until a predetermined time has come, whether the server computer 1 has received return mail in reply to the email message transmitted in step S408. When the computer 1 receives the return mail (S409:YES), flow proceeds to step S410.

In step S410, the received mail analyzing portion 71 determines whether the server computer 1 can receive the return mail by the predetermined time. When the return mail can be received by the predetermined time (S410:YES), flow proceeds to step S411, where the database management portion 9 updates the work status with respect to the relevant order number in the order management database 9f, to "firm order placed", and flow proceeds to step S413. When the return mail cannot be received by the predetermined time (S410:NO), flow proceeds to step S412, where the database management portion 9 updates the work status with respect to the relevant order number in the order management database 9f, to "order cancelled" and the post-stamp-ordering processes end.

In step S413, in response to the detection of the database management portion 9 that work status has been updated in step S411, an email message is created that informs to the supplier whether the server has received the return mail from the purchaser by the predetermined time, that is, the final confirmation of the purchaser's intention to buy the stamp is made. The email message is transmitted from the communication portion 5 to the supplier.

An email message to be transmitted to the supplier when the server has received the return mail from the purchaser by the predetermined time is such as that shown in, for example, FIG. 17(C). In the example of FIG. 17(C), the message prompts the supplier to download the normal image data that has been created in step S311 and to start producing the stamp, as well as prompts the supplier to inform to a predetermined URL (uniform resource locator), after stamp creation is completed, that the stamp has been created. When the supplier who received this email message clicks on strings with a link to a download screen shown in FIG. 18 ("DOWNLOAD" in the example of FIG. 18), the normal image data is transmitted from the communication portion 5 to the supplier computer 2, after a screen to select a file storage location appears. The normal image data can be downloaded at any time after the normal image data has been created.

In step S414, the input data analyzing portion 61 repeatedly determines whether data indicating the stamp production has been completed is input by the supplier and REGISTER button is pressed. When the data indicating that the stamp manufacturing has been completed is input (S414:YES), flow proceeds to step S415 where the database management portion 9 updates the work status with respect to the relevant order number in the order management database 9f to "stamp creation completed", and proceeds to step S416.

In step S416, the input data analyzing portion 61 repeatedly determines whether data indicating that the dispatch of the stamp to the purchaser has been completed is input by the supplier and REGISTER button is pressed. When the data indicating that the dispatch of the stamp has been completed is input (S416:YES), flow proceeds to step S417 where the database management portion 9 updates the work status with respect to the relevant order number in the order management database 9f to "stamp dispatch completed", and proceeds to step S418.

In step S418, in response to the detection of the database management portion 9 that the work status has been updated in step S417, the transmission mail generating portion 72 of the mail management portion 7 generates an email message, such as that shown in, for example, FIG. 17(D), informing the purchaser of the stamp that the stamp dispatch has been completed, based on the stored contents of the work status with respect to the relevant order number. The created email message is transmitted from the communication portion 5 to the purchaser computer 3.

Thus, in the embodiment, update in the work status of the product that the stamp purchaser ordered can be detected by the database management portion 9, so that management of the work status of the products can be centralized. As the work status of the products that the purchaser ordered is updated, the appropriate email messages can be sent to the supplier and/or purchaser according to the updating steps. Therefore, convenience to both of the suppliers and purchasers who join an electronic shopping mall increases because current situations of business transactions can be grasped sequentially, without making access to the server.

In particular steps of updating the work status, such as when the stamp creation has been completed, an email message is not created, and only the necessary information can be notified to the suppliers and purchasers by email messages.

Subsequently, in step S419, the input data analyzing portion 61 repeatedly determines whether data indicating that payment for the stamp has been received from the purchaser is input by the supplier and REGISTER button is pressed. When the data indicating that the payment has been received from the purchaser is input (S419:YES), flow proceeds to step S420 where the database management portion 9 updates the work status with respect to the relevant order number in the order management database 9f, to "payment received" and the post-stamp-ordering processes end.

When the data indicating that the payment is received from the purchaser is not input (S419:NO), the input data analyzing portion 61 determines whether data indicating that the supplier reminds the purchaser to make the payment, or data indicating that the supplier desires to post the purchaser on the undesired customer list, is input by the supplier and REGISTER button is pressed. When the data indicating that reminding for payment is performed, is input, flow proceeds to step S422 where the database management portion 9 updates the work status with respect to the relevant order number in the order management database 9f, to "remind to pay "n" time(s)" (the number of reminding performed for payment corresponds to the number of times that step S422 is performed). Flow returns to step S419.

When the data indicating that the supplier desires to post the purchaser on the undesired customer list is input by the supplier, flow proceeds to step S423 where the database management portion 9 updates the work status with respect to the relevant order number in the order management database 9f, to "post on undesirable customer list". Flow proceeds to step S424. In step S424, data of the customer whose ID corresponds to the purchaser targeted for the undesirable customer list in step S423 is extracted from the customer management database 9e, and it is written into the data that the purchaser is targeted for the undesirable customer list, together with the reason for posting the purchaser on the undesirable customer list. The database management portion 9 manages the lists of purchasers who are thus targeted for the undesirable customer list, unlike the order management database 9f and the handling product database 9f, such that every supplier can view the purchasers targeted for the undesirable customer list.

According to the above-described embodiment, the preview image data is transmitted to the purchaser computer 3 and the supplier computer 2, as more simplified smaller-sized data than the normal image data. Therefore, the purchaser and the supplier can promptly see a preview image. The preview image data is created in the server computer 1, not in the purchaser computer 3, so that the heavy load is not applied to the purchaser computer 3. Further, the purchaser can browse the preview image without preparing a program for creating preview image data. Accordingly, a person who wishes to buy a stamp can order a stamp by easily accessing the server computer 1, so that use of mail-order business for custom-made products, such as stamps, can be promoted.

The preview image data and text data including marks for showing the preview image data in an attached condition are transmitted to a communication terminal of the purchaser, so that the purchaser can view the preview image attached to the text. Therefore, the purchaser can view the preview image together with the additional information of the image.

Further, the created normal image data is transmitted to the supplier, so that the supplier who produces custom-made products does not have create the normal image data using their own computer. This reduces the work loads of the supplier greatly.

Unique information indicating products, such as stamps, business cards, nameplates, and New Year's cards, can be appropriately produced according to orders thereof.

While the preferred embodiment of the invention has been described above, the invention is not limited to the above-described embodiment. Various changes that fall within the scope of the claims can be made. For example, the invention can be applied not only to unique information indicating products, such as stamps, business cards, nameplates, and New Year's cards, but also other general custom-made products. Further, the invention may be applied to not only an electronic shopping mall, such as the electronic shopping mall according to the above-described embodiment, but also mail-order sales directly performed between a supplier and purchaser. Also, the custom-made product sales system of the invention is not limited to the above-described embodiment and, for example, the Web management portion and various databases may belong to separate computers. Further, the administrator computer 4 may be included in the sever computer 1, or connected to the server computer 1 through the Internet 10. Changes in the sequence of each of the steps performed in the above-described embodiment, addition of another step, or elimination of a particular step may be performed, as long as such changes fall within the scope of the invention.

In the custom-made product sales system described as one embodiment of the invention, the first transmitting device transmits the preview image data created by the preview image creating device, together with text data including marks for showing the preview image data in an attached condition. Accordingly, the preview image data and the text data including the marks for showing the preview image data in an attached condition are transmitted to the communication terminal of the purchaser, so that the purchaser can view the preview image attached to the text.

There is provided a custom-made product sales method for selling a custom-made product, using a communication network. The custom-made product sales method described as one embodiment of the invention includes a receiving step in which data on an appearance of the custom-made product is received from a communication terminal of a purchaser who buys the custom-made product, a preview image creating step in which preview image data for the custom-made product is created based on the data received in the receiving step, the preview image data being more simplified smaller-sized image data than normal image data that is used when the custom-made product is produced by a supplier who produces the custom-made product, and a first transmitting step in which the preview image data created in the preview image creating step is transmitted to the communication terminal of the purchaser.

There is provided a server that is used to sell a custom-made product using a communication network. The server according to one embodiment of the invention includes the receiving device, the preview image creating device and the first transmitting device. A computer-readable storage medium stores a program to function a custom-made product sales system for selling a custom-made product using a communication network. The program includes a receiving program, a preview image creating program, and a first transmitting program.

A normal image creating device that creates the normal image data that is used when the custom-made product is produced by the supplier who produces the custom-made product, and a second transmitting device that transmits the normal image data created by the normal image creating device to a communication terminal of the supplier are further provided.

The custom-made product sales method described as one embodiment of the invention further includes a normal image creating step in which the normal image data is created that is used when the custom-made product is produced by the supplier who produces the custom-made product, and a second transmitting step in which the normal image data created in the normal image creating step is transmitted to a communication terminal of the supplier.

The server described as one embodiment of the invention further includes the normal image creating device and the second transmitting device.

A computer-readable storage medium stores a program to function a custom-made product sales system for selling a custom-made product using a communication network. The program includes a receiving program, a preview image creating program, a first transmitting program, a normal image creating program, and a second transmitting program.

Further, the created normal image data is transmitted to the supplier, so that the supplier who produces the custom-made product does not have to create the normal image data using their own computer.

In the custom-made product sales system described as one embodiment of the invention, the custom-made product is a unique information indicating product that indicates unique information.

Further in the invention, the unique information indicating products, such as stamps, business cards, nameplates, and New Year's cards, can be appropriately produced according to orders thereof. The unique information indicating products include stamps, business cards, and New Year's cards on which information of individuals or companies (e.g., names, addresses, postal codes, telephone numbers, and email addresses of individuals or companies) is indicated using a plate or by printing. In the invention, the unique information includes a variety of information, for example, personal information, such as names, addresses, postal codes, telephone numbers, and email addresses of individuals or groups of individuals, such as companies, as well as creative text, catch phrases, and combinations of symbols that have a particular meaning.

As described above, according to the custom-made product sales system of the invention, the preview image data is transmitted to the communication terminal of the purchaser, as more simplified smaller-sized data than the normal image data, so that the purchaser can promptly view the preview image. The preview image data is created at a location other than the communication terminal of the purchaser, so that heavy loads are not applied to the communication terminal of the purchaser. Moreover, the purchaser can create the preview image without preparing a program for creating preview image data. Therefore, mail-order business for the custom-made products using the communication network can be smoothly conducted.

What is claimed is:

1. A method for selling a custom-made product using a communication network, comprising:
   displaying a plurality of suppliers of the custom-made product, the custom-made product being at least one of a stamp or a business card;
   selecting a supplier from the displayed plurality of suppliers;
   displaying a plurality of templates associated with the selected supplier;
   selecting a template from the displayed plurality of templates;
   displaying setting conditions related to the template, the setting conditions including at least one of a grip color or an ink color;
   selecting a plurality of the setting conditions from the setting conditions displayed on a communication terminal of a purchaser, at least one setting condition remaining unselected; and
   displaying a plurality of different preview images based on the selected plurality of the setting conditions on the communication terminal for selection by the purchaser, each of the plurality of different preview images being different with respect to the at least one unselected setting condition.

2. The method for selling a custom-made product as claimed in claim 1, wherein the setting conditions include a font and character contents.

3. The method for selling a custom-made product as claimed in claim 2, wherein the at least one unselected setting condition is at least one of the font, the ink color and the character contents.

4. The method for selling a custom-made product as claimed in claim 1,
   wherein the unselected setting condition is a font, and
   wherein the plurality of different preview images differ only by the font.

5. The method for selling a custom-made product as claimed in claim 1, wherein the purchaser can change at least one of the setting conditions between the displaying the plurality of different preview images and the selecting the plurality of the setting conditions by only one click.

6. A communication system using a communication network for selling a custom-made product, comprising:
   an output data generating device that transmits a plurality of suppliers of the custom-made product to a communication terminal of a purchaser for selection by the purchaser and transmits a plurality of templates associated with a supplier selected by the purchaser to the communication terminal for selection by the purchaser, the custom-made product being at least one of a stamp or a business card;

an analyzing device that transmits setting conditions related to a template selected by the purchaser to the communication terminal for selection by the purchaser, the setting conditions including at least one of a grip color or an ink color;

a receiving device that receives a plurality of the setting conditions that are selected by the purchaser from the communication terminal, at least one setting condition remaining unselected; and an image data creating device that generates a plurality of different preview images based on the selected plurality of the setting conditions, each of the plurality of different preview images being different with respect to the at least one unselected setting condition, and the image data creating portion transmitting the plurality of preview images for display on the communication terminal.

7. The communication system as claimed in claim 6, wherein the setting conditions include a font and character contents.

8. The communications system as claimed in claim 7, wherein the at least one unselected setting condition is at least one of the font, the ink color and the character contents.

9. The communication system as claimed in claim 6, wherein the at least one unselected setting condition is a font, and wherein the plurality of different preview images differ only by the font.

10. The communication system as claimed in claim 6, wherein the purchaser can change at least one of the setting conditions between the displaying the plurality of different preview images and the selecting the plurality of the setting conditions by only one click.

11. A computer-readable storage medium that stores a program to function a custom-made product sales system for selling a custom-made product using a communication network, the program including:

instructions for displaying a plurality of suppliers of the custom-made product on a communication terminal of a purchaser for selection by the purchaser, the custom-made product being at least one of a stamp or a business card;

instructions for displaying a plurality of templates associated with a supplier selected by the purchaser from the plurality of suppliers on the communication terminal for selection by the purchaser;

instructions for displaying setting conditions related to a template selected by the purchaser from the plurality of templates on the communication terminal for selection by the purchaser, the setting conditions including at least one of a grip color or an ink color; and instructions for displaying a plurality of different preview images for selection by the purchaser, the plurality of different preview images being based on a plurality of the setting conditions selected by the purchaser and at least one unselected setting on the communication terminal for selection, each of the plurality of different preview images being different with respect to the at least one unselected setting condition.

12. The computer-readable storage medium as claimed in claim 11, wherein the setting conditions include a font, an ink color and character contents.

13. The computer-readable storage medium as claimed in claim 12, wherein the at least one unselected setting condition is at least one of the font, the ink color and the character contents.

14. The computer-readable storage medium as claimed in claim 11, wherein the at least one unselected setting condition is a font, and wherein the plurality of different preview images differ only by the font.

15. The computer-readable storage medium as claimed in claim 11, wherein the purchaser can change at least one of the setting conditions between the displaying the plurality of different preview images and the selecting the plurality of the setting conditions by only one click.

\* \* \* \* \*